United States Patent
Arrelid et al.

(10) Patent No.: US 8,826,453 B2
(45) Date of Patent: Sep. 2, 2014

(54) CONTENT PROVIDER WITH MULTI-DEVICE SECURE APPLICATION INTEGRATION

(71) Applicant: Spotify AB, Stockholm (SE)

(72) Inventors: Mattias Robert Arrelid, Stockholm (SE); Mikael Gustav Olenfalk, Tyreso (SE)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 13/688,747

(22) Filed: Nov. 29, 2012

(65) Prior Publication Data

US 2013/0139271 A1 May 30, 2013

Related U.S. Application Data

(60) Provisional application No. 61/564,826, filed on Nov. 29, 2011.

(51) Int. Cl.
*H04L 29/06* (2006.01)

(52) U.S. Cl.
USPC ........... 726/27; 726/6; 726/23; 715/234; 715/719; 715/738; 725/37; 725/106; 709/219; 709/223; 709/224; 709/226; 709/229; 709/232; 709/250; 713/189

(58) Field of Classification Search
USPC ............ 715/234, 719, 738; 725/37, 106; 726/26–29, 6, 23; 707/100, 104.1; 709/232, 226, 223, 224, 229, 250, 219; 713/189
See application file for complete search history.

(56) References Cited

U.S. PATENT DOCUMENTS

| 7,181,603 B2* | 2/2007 | Rothrock et al. ............ 713/1 |
| 2003/0177371 A1* | 9/2003 | Rothrock et al. ............ 713/189 |
| 2005/0195975 A1* | 9/2005 | Kawakita .................... 380/30 |
| 2007/0043766 A1* | 2/2007 | Nicholas et al. ........... 707/104.1 |
| 2007/0088832 A1* | 4/2007 | Tsang et al. ................ 709/227 |
| 2011/0072521 A1* | 3/2011 | Ho et al. .................... 726/29 |

(Continued)

FOREIGN PATENT DOCUMENTS

| WO | WO 99/48296 A1 | 9/1999 | |
| WO | WO 02/10907 A2 | 2/2002 | |
| WO | WO0210907 * | 2/2002 | ............ G06F 9/00 |

OTHER PUBLICATIONS

Spotify-AB, ISR/WO PCT/IB2012/002909, Jul. 4, 2013, 7 pgs.

*Primary Examiner* — Hadi Armouche
*Assistant Examiner* — Hee Song
(74) *Attorney, Agent, or Firm* — Morgan, Lewis & Bockius LLP

(57) ABSTRACT

Methods and systems for providing access to content are disclosed. The method is performed at least in part at a client computer system having a processor and memory. The method includes executing a host application associated with a first party. In some implementations, the host application is a media player. The method further includes initiating a secure communication channel between the host application and a server associated with the first party. The method further includes executing a supplemental application associated with a second party. The method further includes accessing, with the supplemental application, content licensed to the first party, wherein the licensed content is accessible to the supplemental application via the secure communication channel subject to terms of a licensing agreement. In some implementations, the content is media content, such as music, movies, and the like.

75 Claims, 8 Drawing Sheets

(56) References Cited

U.S. PATENT DOCUMENTS

2012/0079578 A1* 3/2012 Dachiraju et al. ............... 726/7
2012/0159337 A1* 6/2012 Travilla et al. ............... 715/738
2012/0210225 A1* 8/2012 McCoy et al. ............... 715/719
2012/0210353 A1* 8/2012 Wong et al. ............... 725/37
2012/0324552 A1* 12/2012 Padala et al. ............... 726/6
2013/0061129 A1* 3/2013 Liu et al. ............... 715/234
2013/0103814 A1* 4/2013 Carrasco et al. ............... 709/223

* cited by examiner

CONTENT PROVIDER WITH MULTI-DEVICE SECURE APPLICATION INTEGRATION

RELATED APPLICATIONS

This application claims priority to U.S. Provisional Application No. 61/564,826, filed Nov. 29, 2011, entitled "Content Provider with Multi-Device Secure Application Integration," which is hereby incorporated by reference in its entirety.

TECHNICAL FIELD

The disclosed implementations relate generally to controlling and playing back media content.

BACKGROUND

In order to satisfy owners and producers of digital content, such as music, movies, and the like, digital content distribution requires many commercial and technical safeguards. Providers of digital content often must take measures to prevent access to their content by unauthorized computer programs, for fear that these applications will illegally copy, display, or distribute the protected content. Moreover, legitimate content providers often license content from content owners and/or producers (e.g., artists, record labels, movie studios, etc.), and the terms of the licenses typically require that adequate safeguards be used so that the licensed content is protected from pirating. Thus, distributors of such content often use digital rights management ("DRM") tools to prevent copying and recording of their content. But DRM techniques and the strict terms of the licenses between content providers and content owners/producers often impede legitimate content providers from offering fast, convenient, and ubiquitous access to their content catalogs. The ideas disclosed herein help alleviate these problems, and allow legitimate content providers to expand the ways in which they provide licensed digital content to users and third parties.

SUMMARY

Some implementations provide a computer-implemented method for providing access to content. The method is performed at least in part at a client computer system having a processor and memory. The method includes executing a host application associated with a first party. The method further includes initiating a secure communication channel between the host application and a server associated with the first party. The method further includes executing a supplemental application associated with a second party. The method further includes accessing, with the supplemental application, content licensed to the first party, wherein the licensed content is accessible to the supplemental application via the secure communication channel subject to terms of a licensing agreement.

In some implementations, the supplemental application extends the functionality of the host application. In some implementations, the supplemental application is a plug-in to the host application. In some implementations, the host application is a media player application. In some implementations, the supplemental application is authorized by the first party for use with the host application. In some implementations, the server is a second client computer system.

In some implementations, the licensed content includes a plurality of audio files. In some implementations, accessing the licensed content comprises initiating playback of one of the plurality of audio files via an affordance provided by the supplemental application. In some implementations, accessing the licensed content further comprises streaming the audio file from the server to the client computer system.

In some implementations, the licensed content includes a plurality of video files. In some implementations, accessing the licensed content comprises initiating playback of one of the plurality of video files via an affordance provided by the supplemental application. In some implementations, accessing the licensed content further comprises streaming the video file from the server to the client computer system.

In some implementations, the supplemental application accesses services of one or both of the host application and the first party via one or more application programming interfaces of the host application.

In some implementations, the licensed content is not available to applications that are executed separately from the host application. In some implementations, the secure communication channel is not accessible to applications executed separately from the host application. In some implementations, the host application is executed within an operating system. In some implementations, the supplemental application can only be executed in conjunction with the host application. In some implementations, the licensing agreement does not permit access to the licensed content by applications that are executing on the client computer system separately from the host application.

In some implementations, the secure communication channel uses Hypertext Transfer Protocol Secure (HTTPS). In some implementations, the secure communication channel uses encrypted communications. In some implementations, initiating the secure communication channel includes authenticating the server.

Some implementations provide a computer-implemented method for providing access to content. The method is performed at least in part at a client computer system having a processor and memory. The method includes executing a host application. The method further includes executing a supplemental application. The method further includes accessing, with the supplemental application, content that is subject to a licensing agreement between a provider of the host application and one or more content owners, wherein the licensed content is accessible to the supplemental application subject to terms of the licensing agreement.

Some implementations provide a computer-implemented method for handling application permissions. The method is performed at least in part at a client computer system having a processor and memory. The method includes executing a host application. The method further includes receiving, from a user, a request to use a supplemental application. The method further includes executing the supplemental application in conjunction with the host application using the first set of permissions. The method further includes detecting that the user has approved the supplemental application. The method further includes, in response to the detecting, associating a second set of permissions with the supplemental application and executing the supplemental application using the second set of permissions. In some implementations, the method further includes installing the supplemental application as a plug-in to the host application.

In some implementations, the first set of permissions grants to the supplemental application read-only access to data associated with an account of the user. In some implementations, the first set of permissions grants to the supplemental application permission to read playlists and content history data associated with the account of the user.

In some implementations, the second set of permissions grants to the supplemental application read/write access to data associated with an account of the user. In some implementations, the second set of permissions grants to the supplemental application permission to create and modify playlists associated with the account of the user.

In some implementations, the method further includes updating account information associated with the user to indicate that the supplemental application has been installed by the user on the first client computer. In some implementations, the method further includes updating the account information associated with the user to indicate the permissions to be applied to the supplemental application.

In some implementations, the method further includes performing the following steps at a second client computer system. Executing a second host application. Determining, from the account information associated with the user, that the supplemental application has been installed on the first client computer, and the permissions to be applied to the supplemental application. Installing the supplemental application on the second client computer. Executing the supplemental application using the determined permissions.

Some implementations provide a computer-implemented method for authorizing access to resources. The method is performed at least in part at a client computer system having a processor and memory. The method includes receiving a supplemental application for execution in conjunction with a host application, wherein the host application provides access to licensed content items that are subject to a licensing agreement between a provider of the host application and an owner of the content items. The method further includes receiving an authentication file associated with the supplemental application. The method further includes detecting a request to access a resource associated with the host application. The method further includes determining, using the authentication file, whether the supplemental application is authorized to access the resource. The method further includes, if the supplemental application is authorized to access the resource, providing access to the resource, and if the supplemental application is not authorized to access the resource, not providing access to the resource.

In some implementations, the request to access the resource originated from the supplemental application. In some implementations, the request to access the resource is a request to access at least one of the licensed content items. In some implementations, the at least one of the licensed content items is stored at a server remote from the client computer system. In some implementations, the request to access the resource is a request to access an application programming interface of the host application. In some implementations, the authentication file is encrypted. In some implementations, the authentication file is cryptographically signed.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device is provided that comprises means for performing any of the methods described herein.

In accordance with some implementations, an electronic device is provided that comprises a processing unit configured to perform any of the methods described herein.

In accordance with some implementations, an electronic device is provided that comprises one or more processors and memory storing one or more programs for execution by the one or more processors, the one or more programs including instructions for performing any of the methods described herein.

In accordance with some implementations, an information processing apparatus for use in an electronic device is provided, the information processing apparatus comprising means for performing any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
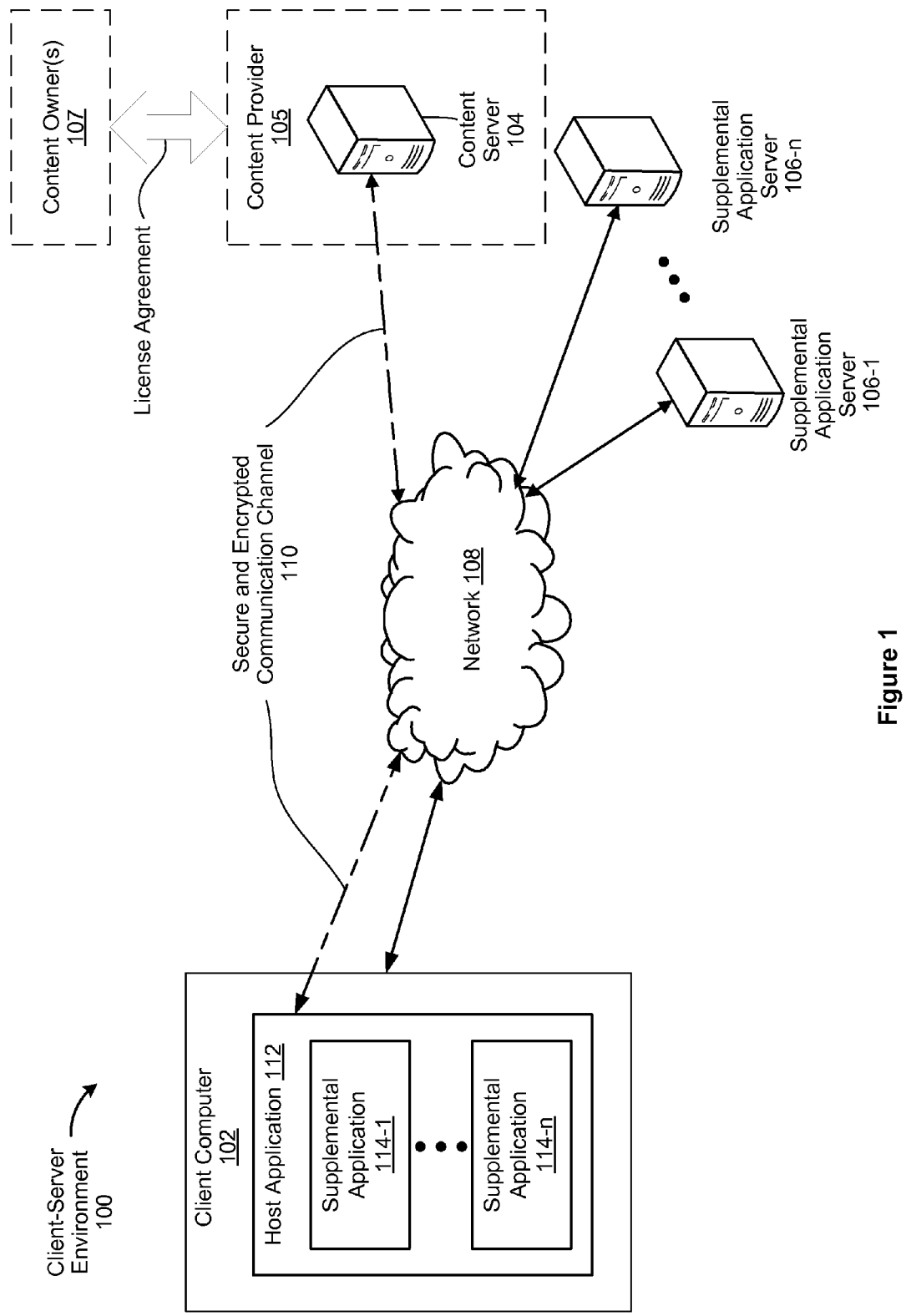
FIG. 1 is a block diagram illustrating a server client environment in accordance with some implementations.

Media consumption using electronic devices is becoming more and more popular. Users are increasingly consuming music, movies, television shows, podcasts, and the like on devices such as laptop computers, tablet computers, mp3 and other digital media players, mobile telephones, etc. Media content can be delivered to these devices in various different ways. For example, many broadcast providers (e.g., radio stations, television networks) provide access to their broadcast programming via the Internet. Users can navigate to web pages associated with these providers (or use dedicated software and/or hardware) to access the content in real time. In another content distribution model, users can purchase media content items from an online marketplace, storing the content items for as long as they like. For example, a user may pay a third party in exchange for downloading audio tracks, movies, audio books, etc., directly to his computer. In these cases, the content items may be playable or otherwise accessible by various computer applications, even those that are not associated with or provided by the seller of the content item. For example, once a song is downloaded to a computer, that song may be playable on that computer, or transferred to another device (e.g., a smart phone, a different computer, etc.). These content distribution methods are in many respects analogous to the more traditional content distribution channels of broadcast media and brick-and-mortar marketplaces.

Another content distribution model offers on-demand access to a catalog of content without charging the user on a per-content-item basis. Such services may be provided, for example, for a fee (e.g., a subscription fee in exchange for access to the entire catalog of content), for "free" (e.g., supported by advertising revenue or another revenue source), or a combination of these (e.g., where a limited free service is supported by fees paid by others for an unlimited service). These types of distribution models have been difficult to implement, however, because the licensing agreements necessary between the content provider and the content owners and producers (e.g., artists, record labels, movie studios, television networks, and the like) take substantial time, effort, and money to negotiate. Specifically, because the users are not paying per item, the royalty payments are somewhat non-traditional. Moreover, these licensing agreements typically require the content to be protected from unauthorized access and copying. This is often achieved through the use of digital rights management ("DRM") techniques that prevent unauthorized users, applications, and/or devices from accessing the content. For example, a provider of music content may provide a dedicated media browser and/or player application with which users can browse and listen to the music content, as well as build playlists, share music suggestions with friends, and the like. (Similar applications may be provided for browsing and presenting other content as well, such as audio (e.g., podcasts, music, spoken word, radio shows, etc.), videos (e.g., movies, television shows, user-generated videos, animation, etc.), images, or various combinations of these content types.) Because the content can only be accessed by the particular application provided by the content provider, illegal copying and distribution of the content can be prevented or at least hindered.

But limiting access to the content may end up limiting the ways in which users can interact with and consume the content. Specifically, a content provider may not have the ability or the desire to include in its application all of the different, unique, and interesting features and functionalities that may enhance the user experience when consuming the content. In order to satisfy the terms of the content licensing agreements while also providing extensive and unique features and functionalities to consumers, the present application describes a host application that serves as a platform for supplemental applications. The supplemental applications can extend and/or supplement the features and functionalities already provided by the host application. One example of a host application is a media player/browser that allows users to browse and playback music, as well as make, edit, and share playlists. Supplemental applications can be installed on and/or executed in conjunction with the host application to provide other features, such as displaying lyrics of songs that are being played back by the host application, providing music recommendations, enabling collaborative curation of playlists, enabling access to and presentation of other information (such as information about the artist of a track being presented), and the like. Of course, other supplemental applications and host applications are also considered, as discussed below.

In some implementations, a host application is created and/or provided by a content provider, while supplemental applications are created and/or provided by any entity, including the content provider or other entities. One benefit of this arrangement is that the content provider—who is permitted to provide access to media content by virtue of a licensing agreement with content creators—can leverage the creativity and ingenuity of other developers to provide a novel and exciting user experience to its users. In return, the developers can access an audience and a content catalog that they would otherwise be unable to access. For example, a magazine that is well known for providing music reviews and commentary can develop a supplemental application that offers playlists that are created and/or recommended by that magazine. Users can then select these playlists for presentation by the host application. Thus, while the host application facilitates access to the licensed content (and provides media presentation functions such as audio/visual playback interfaces, controls, etc.), the supplemental application provides additional user functions and features that the content provider may not otherwise provide. Moreover, the developers of the supplemental applications are able to reach an audience that they might otherwise not be able to reach, and they can provide access to content, via the host application, that they might otherwise not be able to provide. And while the above example describes suggesting playlists as an extended functionality to the host application, many other features and functions are possible. For example, some applications may provide information about the currently presented media item, such as liner notes, reviews, lyrics, band/artist/actor profiles, tour dates, photo slideshows, and the like. Some applications may provide different ways to initiate presentation of media content, such as by providing reviews, commentary, and/or recommendations that include a media playback controls to initiate presentation of the subject media content. Other applications may inform users of the currently played artist's upcoming concerts (or similar artists), and even allow users to purchase tickets to the concerts via the supplemental and/or the host application. Yet other applications may allow a user to purchase CDs or digital media by the currently played artist (or other similar or recommended artists).

Providing a platform in which supplemental applications can access a large catalog of licensed content provides several benefits that would be difficult or impossible to achieve were each supplemental application provider to attempt to provide their applications independently. For example, the provider of the host application allows the supplemental applications to access a large catalog of licensed media content, and it would be difficult and expensive for each individual application provider to negotiate with content owners to access the same content. Thus, consumers would be deprived of new and interesting ways of learning about, consuming, and interacting with media content. But because the license agreements are already in place between the provider of the platform (e.g., the host application) and the content owners, and because the content is ultimately being accessed by the host application, the supplemental applications can access the licensed content without additional licenses from the content owners.

Moreover, the host application provides a consolidated environment for users to access and consume media content. Accordingly, users will be able to use a single host application (with familiar playback controls, social media sharing options, media management features, playlist creation/management options, and the like) while also reaping the benefits of the extended features and/or content provided by (or accessible to) the supplemental applications.

Attention is now directed to the figures, and in particular to FIG. 1, which is a block diagram of a client-server environment 100, according to some implementations. The client-server environment 100 includes a client computer 102, a content server 104, and supplemental application servers (106-1 ... 106-n) that are connected through a network. In some implementations, the supplemental application servers 106-n are connected to the network 108 through one or more other computers, such as the content server 104.

In some implementations, the content server 104 is associated with a content provider 105. (In some implementations, one or more supplemental application servers 106-n are also associated with the content provider 105.) In some implementations, the content provider 105 provides access to a catalog of media content items, such as music, movies, television shows, videos, and the like. As described above, in some implementations, at least some of the content provided by the content provider 105 is subject to one or more licensing agreements between the content provider 105 and one or more media content owners and/or creators 107. In some implementations, the content server 104 also provides and/or facilitates access to supplemental applications, as described below.

In some implementations, the supplemental application servers 106-n are associated with one or more third-parties, and provide access to supplemental applications 114-n, which are discussed below. In some implementations, supplemental applications can be downloaded from the supplemental application servers 106-n to the client computer system 102. In some implementations, they are provided to the content server 104 for distribution. In some implementations, the third-parties are different entities from the content provider 105. For example, the content provider 105 may be a business entity that provides access to (and hardware and/or software tools allowing access to) digital music, and the supplemental application servers 106-n may be associated with other businesses (including any business, ranging from concert promoters to soft-drink producers) or non-business entities that are separate from the content provider 105 (e.g., individual people or groups of people).

The client computer 102 includes a host application 112 and supplemental applications (114-1 . . . 114-n). In some implementations, the client computer 102 is one of the group consisting of: a personal computer, a mobile electronic device, a laptop, a tablet computer, a mobile phone, a digital media player, or any other electronic device able to present media content.

Generally, applications may be understood as computer software (e.g., made up of one or more computer programs) that is designed to help a user perform certain tasks. Applications may include instructions that are executable by a processor of a computer, and may be instantiated in source code (e.g., in a human readable programming language) and/or object code (e.g., computer readable binary code). Some examples of applications include word processing applications, games, media players/browsers, image viewers, image/photo editors, playlist managers, and the like. In many cases, applications are differentiated from operating systems, which control, manage, and schedule access to hardware resources of a computer, including memory, processors, hard disks, and/or peripherals, etc. Applications may be executed in conjunction with an operating system, and may programmatically interact with an operating system. For example, an operating system may provide programmatic interfaces (e.g., application programming interfaces or APIs) that applications can use in order to access hardware resources such as input and output devices (including speakers, keyboards, displays, etc.), storage devices, and the like, or to access other processes, algorithms, routines, or programs provided by the operating system. In some implementations, applications are programmed such that they must be executed within an operating system in order to operate.

In some implementations, the host application 112 is a media player/browser. In some implementations, the host application software resides fully or partially on the client computer 102. For example, a user may install a media player/browser (e.g., the host application 112) on the client computer 102 as a typical computer application (e.g., where executable code for the application is stored in memory (e.g., a hard drive) of a computer). In some implementations, the host application 112 is a fully or partially web-based application. For example, a web-based media player/browser application may be accessible from a web browser (or any other application or operating system that can access and/or execute the web-based application). In some implementations, some or all of the executable code for a web-based application is stored or cached on a computer and/or server remote from the client computer 102 (e.g., the content server 104). The web-based application can be accessed by navigating an appropriate computer program (e.g., a web browser, an operating system, etc.) to an address where the application can be found, for example, by supplying a uniform resource identifier ("URI"). The web-based application is then executed by one or more computers (including, for example, the content server 104, the client computer 102, and/or any combination of those or other computers/devices). In some implementations, the operations of the host application 112 described herein apply equally or by analogy to both client-based and web-based host applications.

Supplemental applications 114-n are configured to extend and/or supplement the functionality of the host application 112. For example, supplemental applications 114-n can provide access to additional content or information (and/or managed or curated content), provide different ways of interacting with content available from the content server 104, and the like. Supplemental applications 114-n may be understood as computer software (e.g., made up of one or more computer programs) that is designed to operate in conjunction with a host application 112. In some implementations, the supplemental applications 114-n are or include code modules (e.g., source code, object code, or the like) that are configured to be installed in or executed in conjunction with the host application 112. In some implementations, supplemental applications 114-n are "plug-ins" or "add-ons" to the host application 112.

In some implementations, the supplemental applications 114-n are only able to be executed in conjunction with the host application 112. In such cases, the supplemental applications 114-n are programmatically linked to the host application 112 such that they cannot be executed unless the host application 112 is installed and/or running on the client computer 102. For example, the code that makes up a supplemental application 114-n may refer to, call, or rely on processes, resources, and/or APIs that are provided by the host application 112. In some implementations, supplemental applications 114-n must be authenticated before they can be executed in conjunction with the host application 112. Thus, access to resources and/or services of the host application 112 by malicious applications or programs can be prevented or limited. In some implementations, authentication of supplemental applications 114-n is provided by authentication tokens (e.g., cryptographically signed files) that allow the host application 112 to verify that the supplemental applications 114-n are properly authorized. Additional details relating to authentication of supplemental applications are described herein.

In some implementations, supplemental applications 114-n are or include a uniform resource identifier ("URI") (e.g., a uniform resource locator ("URL"), IP Address, or the like). In such cases, the programs (e.g., the computer code) that make up the supplemental application may be stored on a remote device associated with the URI (e.g., a supplemental application server 106-n), and may be downloaded, entirely or partially, to the client computer 102 for execution in conjunction with the host application 112. In some implementations, the programs or portions of the programs may be executed on the remote device. Thus, like the host application 112, supplemental applications 114-n may be installed on (e.g., stored on a hard drive) and executed by the client computer 102, or may be completely or partially stored and/or executed on a remote computer (e.g., a supplemental application server 106-n, discussed below). Supplemental applications 114-n as described may be used in implementations where the host application 112 is client based (e.g., the program(s) are stored and/or executed by the client computer 102) or web-based (e.g., the program(s) are stored and/or executed at least in part on a remote device). Some specific examples of supplemental applications 114-$n$ are discussed herein.

In some implementations, supplemental applications 114-$n$ are provided by supplemental application servers (106-1 . . . 106-$n$). As discussed above, supplemental application servers 106-$n$ may be associated with business entities or individuals who develop and/or provide supplemental applications 114-$n$ for use with the host application 112. As noted above, in some implementations, supplemental applications 114-$n$ are downloaded to the client computer 102 from the supplemental application servers 106-$n$ for use with the host application 112. However, supplemental applications do not need to be hosted by, communicate with, or rely on supplemental application servers 106-$n$. For example, application developers that are not affiliated with any particular business entity and do not host a supplemental application server 106-$n$ may provide supplemental applications to the content provider 105 so the content provider 105 can make the supplemental applications accessible to client computers 102.

In some implementations, supplemental applications 114-$n$ use and/or access information stored at the supplemental application servers 106-$n$ when they are executed by the client computer 102. For example, a supplemental application 114-$n$ may display the lyrics of songs that are played back by the host application 112 (and provided by the content server 104). In this example, the supplemental application server 106-$n$ may store and provide lyrics to the supplemental application 114-$n$. For simplicity, the supplemental applications 114-$n$ are described as accessing information (e.g., lyrics, content reviews, playlists, etc.) from the same server(s) from which the supplemental applications 114-$n$ are downloaded. However, this may not always be the case, as supplemental applications 114-$n$ may access information from other sources as well. For example, an application developer that is not related to WIKIPEDIA may provide a supplemental application that displays the publicly accessible WIKIPEDIA page of the band that a user is listening to. In that case, the supplemental application may access servers associated with WIKIPEDIA to present to the user within the host application 112.

In some implementations, supplemental applications 114-$n$ must be approved by the content provider 105 (e.g., the business entity associated with the content server 104) in order for the host application 112 to allow them to be installed and/or executed on the client computer 102, or to allow them to access resources of the host application 112 and/or the content server 104. In some implementations, the approval process includes providing the application to the content provider 105, and receiving a cryptographically signed authentication file (also referred to as a "digital signature") from the content provider once the supplemental application is approved. The cryptographically signed authentication file may then be included as part of the supplemental application 114-$n$. The host application 112 is configured to use the digital signature to ensure that any supplemental application 114-$n$ that requests access to resources of the host application 112 and/or licensed content from the content server 104 is properly authorized to do so. In some implementations, the host application 112 uses the digital signature to determine that the supplemental application was, in fact, approved by the content provider 105, and to ensure that the supplemental application has not been altered after it was approved. Such measures help prevent piracy of the licensed content (or other unauthorized access to the host application 112 and/or the content server 104) because the host application 112 will not install or execute any unauthorized or adulterated applications. These or other similar measures that restrict access to the licensed content (or at least ensure that all access is controlled by the host application 112 or content provider 105) may be required by the terms of the license agreement(s) between the content provider 105 and the content owner(s) 107.

As described above, authenticating supplemental applications 114-$n$ is important to ensure that unauthorized applications cannot access content from the content server 104. Such authentication techniques may also be used to help identify supplemental applications 114-$n$ to the content server 104 so that the content server 104 can identify content access permissions (or other types of permissions) that pertain to the supplemental application 114-$n$. For example, a supplemental application 114-$n$ may request access to a content item that is only accessible by certain supplemental applications 114-$n$. The content server 104 can use the digital signature of the requesting supplemental application 114-$n$ to determine whether that application is authorized to access the track. One exemplary use case is for an entity (e.g., a business, individual person, trade group, etc.) to offer access to an unreleased musical track via that entity's supplemental application (which can, in turn, show advertisements, provide brand exposure, or otherwise provide some financial or other benefit for the entity). First, the entity may acquire the right to access the content from the content provider 105 and/or the content owners 107. The supplemental application is then given access rights by the content provider 105 to access the unreleased track. When the content provider 105 receives a request from a client computer 102 for the unreleased track, the content server 104 uses the digital signature to verify whether the requesting supplemental application is, in fact, authorized to access that track, and allow or deny access as appropriate.

Returning to FIG. 1, the host application 112 is configured to communicate with the content server 104 using a secure and encrypted communication channel 110. Using a secure and encrypted communication channel helps ensure the security of the transmission of licensed content from the content server 104 to the client computer 102 by preventing eavesdropping on data transmissions, and by ensuring that the content server 104 only communicates to authorized client computers (and vice versa). Like the cryptographically signed authentication file, these measures also help to prevent piracy of and unauthorized access to the licensed content, and may be required by the terms of a license agreement between the content provider 105 and the content owner(s) 107. In some implementations, the secure and encrypted communication channel 110 (also referred to as "communication channel 110") uses Hypertext Transfer Protocol Secure (HTTPS) communication protocol between the host application 112 and the content server 104. In some implementations, other communication protocols and encryption techniques are used for the communication channel 110.

In some implementations, the host application controls the communication channel 110 such that only authorized communications are sent between the content server 104 and the client computer 102. For example, the host application 112 will not allow other applications running on the client computer 102 (e.g., other applications that execute within an operating system of the client computer but outside the host application 112) to access the communication channel 110. Further, the host application 112 will not allow unauthorized or adulterated supplemental applications 114-$n$ to be installed in and/or executed by the host application 112, or will otherwise prevent them from communicating with the content server 104 via the communication channel 110.

The application platform described herein can support myriad supplemental applications that can extend the functionality of the host application 112, and can result in novel and interesting ways for users to interact with and/or consume content. But when many different supplemental applications become available, it may result in user confusion and/or unwanted interference between different supplemental applications. For example, supplemental applications may be able to make modifications to the host application 112 and/or user's media information, such as by modifying, creating, or deleting playlists that were created by a user in a host application 112, changing playback settings, posting to social networks, or the like. In some implementations, the application platform described herein uses a tiered permission structure to enable users to preview supplemental applications without necessarily providing all of the permissions that the supplemental application may require.

In some implementations, a tiered permission structure allows a user to select a supplemental application 114-n for use with the host application 112, but only provides the supplemental application 114-n with a first set of permissions. In some implementations, the first set of permissions is less than all of the permissions that the supplemental application 114-n requires to enable all of its functions and/or features. In some implementations, the first set of permissions includes "read only" permission to the user's information (including playlists, play history, profile information, social networking activity, media sharing data, etc.). Thus, the user can be assured that a supplemental application 114-n will not be able to modify the user's information until and unless the user permits it. In some implementations, the first set of permissions allows a supplemental application 114-n to create new playlists or initiate presentation of media content, but does not allow the supplemental application 114-n to modify or delete playlists, post to a user's social network(s), access the user's personal and/or profile information, etc. In some implementations, the permissions in the first set are determined by the content provider 105. For example, the content provider 105 may determine the permissions that apply to all or some supplemental applications 114-n during the "preview" period. In some implementations, the provider of the supplemental application 114-n determines or requests the permissions that are to apply during the "preview" period. The permissions that are required by any supplemental application 114-n may be accessible to the user so that he or she can either accept or reject the permissions.

In some implementations, the first set of permissions is granted to all supplemental applications 114-n by default during a "preview" period, and without requiring separate user assent to the permissions for each supplemental application that is previewed. When and if additional permissions are required or requested by a supplemental application 114-n (e.g., when the user "approves" the supplemental application), the user is prompted to provide assent for those permissions to be granted. In some implementations, the "preview" period of a supplemental application 114-n is defined by the level of permissions that the user, the host application 112, and/or the content server 104 have associated with the supplemental application 114-n. In such cases, the supplemental application 114-n may be installed on the client computer 102 and programmatically interact with the host application 112 (e.g., through application programming interface calls) in the same way during and after the "preview" period, with the only difference that the supplemental application 114-n is restricted from accessing or modifying certain functions and/or data.

In one exemplary implementation of the tiered permissions described, a user may select to "preview" a supplemental application 114-n, for example, by selecting the supplemental application from an application browsing interface of a host application 112. When selected for preview, the supplemental application 114-n is associated with a first set of permissions and becomes available to the user through the host application 112. (E.g., the supplemental application 114-n may appear in an "installed apps" list or a "trial apps" list in a user interface of the host application 112.) The user is then free to use the supplemental application 114-n to the extent allowed by the first set of permissions. The user may then decide to "approve" the application, e.g., by granting permissions commensurate in scope with the requirements of the supplemental application 114-n.

Figure 2:
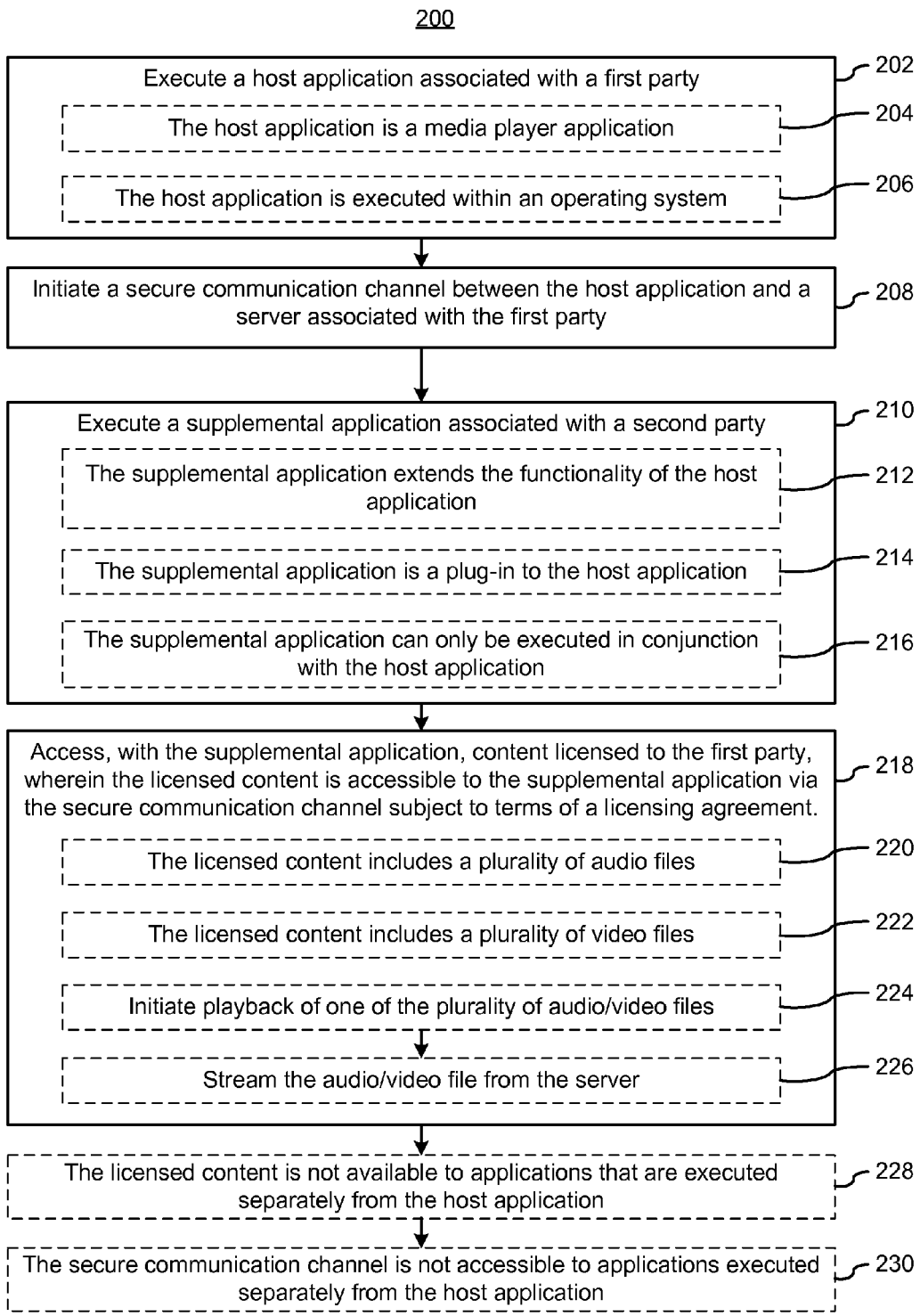
FIG. 2 is a flow diagram illustrating a method for providing access to content in accordance with some implementations.

FIG. 2 is a flow diagram representing a method 200 for providing access to content, according to some implementations. The method 200 is performed at least in part at a client computer (e.g., the client computer 102) having at least one processor and memory, the memory storing instructions for execution by the processor.

A host application associated with a first party is executed (202). In some implementations, the first party is a business entity, a server computer, and/or an individual. In some implementations, the first party is a content provider that creates, distributes, and/or makes available a host application. In some implementations, the first party is a content provider that also provides access to media content items that are subject to a licensing agreement between the content provider and one or more content owners and/or producers. In some implementations, the host application is a media player/browser application (204). The media player application allows users to search for and present media content. In some implementations, the host application is executed within an operating system (206). In some implementations, the host application also supports the use of supplemental applications, as described herein.

A secure communication channel is initiated between the host application and a server associated with the first party (208). In some implementations, the secure communication channel is not accessible to applications executed separately from the host application. For example, the secure communication channel may be initiated by the host application (e.g., the host application 112), and controlled and/or mediated by the host application, so that only authorized communications may occur using the secure communication channel. This may include preventing unauthorized applications or other processes from sending information or receiving information using the secure communications channel. In some implementations, the secure communication channel uses Hypertext Transfer Protocol Secure (HTTPS). In some implementations, the secure communication channel uses encrypted communications (e.g., in accordance with the HTTPS protocol). In some implementations, initiating the secure communication channel includes authenticating the server (e.g., in accordance with the HTTPS protocol). In some implementations, the secure communication channel is an authenticated session between the client computer (e.g., the client computer 102) and a server (e.g., the content server 104).

A supplemental application associated with a second party is executed (210). In some implementations, the second party is a business entity, a server computer, and/or an individual that is different from the first party. For example, if the first party is a business that provides access to music content (e.g., from one or more server computers), the second party may be a business entity, organization, or individual that is different from the content provider. In some implementations, the second party creates, distributes, and/or makes available a supplemental application (e.g., supplemental application 114-n). In some implementations, the first party and the second party are different business entities, the host application is developed by the first party, and the supplemental application is developed by the second party and approved by the first party.

In some implementations, the supplemental application extends the functionality of the host application (212). For example, the supplemental application (e.g., supplemental application 114-n) is configured to add a feature, function, or operation that was not previously available in the host application, or duplicates (or improves on) an already available feature, function, or operation of the host application. In some implementations, the supplemental application is a plug-in to the host application (214). In some implementations, the supplemental application accesses additional content and/or information (e.g., song lyrics, album art, informational pages, concert dates, movie showtimes, etc.) that the host application is not otherwise configured to access. In some implementations, the supplemental application is authorized by the first party for use with the host application. In some implementations, the supplemental application can only be executed in conjunction with the host application (216). For example, the supplemental application may programmatically rely on the host application for execution. In some implementations, the supplemental application uses services, processes, and/or functions that are provided by the host application, such as those that enable playlist creation and management, media presentation, social network access (read and/or write access), and the like.

In some implementations, the supplemental application accesses services of one or both of the host application and the first party via one or more application programming interfaces of the host application. In some implementations, the services are selected from the group consisting of services that: initiate presentation of a content item (e.g., begin audio/video playback); terminate presentation of a content item (e.g., stop/pause/skip audio/video content); add a content item to an existing playlist; reorder content items in an existing playlist; associate a new playlist with the host application (e.g., so that the new playlist appears in a list of playlists in a GUI of the host application); enable purchasing of a content item; access a list of top charts of content items (and/or curated or managed charts); access editorial reviews of content items (e.g., reviews of bands, albums, songs, podcasts, books, movies, television shows, other videos, etc.); access personalized recommendations of content items; access content items related to a selected content item (e.g., access, request, and/or initialize a playlist of content items similar to the selected content item); provide a notification of an upcoming concert or event (e.g., in order to display a list of upcoming concerts of a currently played artist); access promotional material about a concert or event; purchase tickets to a concert or event; initiate presentation of a game; register a high score in a game; access a leader board of high scores in a game; access song lyrics; add, edit, or correct song lyrics; access information about users in a social graph; access a list of followers in a social network; access an influence score in a social network; access a status notification in a social network; post a status notification in a social network; and push a status notification to users in a social network.

Content licensed to the first party is accessed with the supplemental application (218). The licensed content is accessible to the supplemental application via the secure communication channel subject to the terms of a licensing agreement. As described above, a content provider may provide access to content (such as music, movies, television shows) that the content provider has access to by virtue of a licensing agreement with the content owner(s) and/or producer(s). Thus, the content is accessed by the supplemental application (e.g., the supplemental application 114-n) via the host application, and using the secure communication channel that is initiated by the host application. In some implementations, the content is accessed by downloading it from the server. In some implementations, the content was previously downloaded from the server to the client computer system.

In some implementations, the licensed content includes a plurality of audio files (220). In some implementations, the licensed content includes a plurality of video files (222). In some implementations, the method includes initiating playback of one of the plurality of audio and/or video files (224). In some implementations, accessing the licensed content (218) comprises initiating playback of one of the plurality of audio and/or video files via an affordance provided by the supplemental application. In some implementations, the audio/video file(s) are streamed from the server (e.g., content server 104, or a second client computer system separate from the client computer system 102) to the client computer (e.g., client computer 102) after playback is initiated (226).

In some implementations, as described above, the licensed content is not available to applications that are executed separately from the host application (228). In some implementations, the secure communication channel is not accessible to applications that are executed separately from the host application (230). For example, the host application will not allow other applications that are executed by the client computer system 102 (i.e., those that are not supplemental applications 114-n configured to execute in conjunction with the host application) to access the licensed content from the content provider. This may be accomplished by preventing other applications from accessing the secure communication channel between the host application (e.g., the host application 112) and the server associated with the first party (e.g., the content server 104 associated with the content provider 105).

Figure 3A:
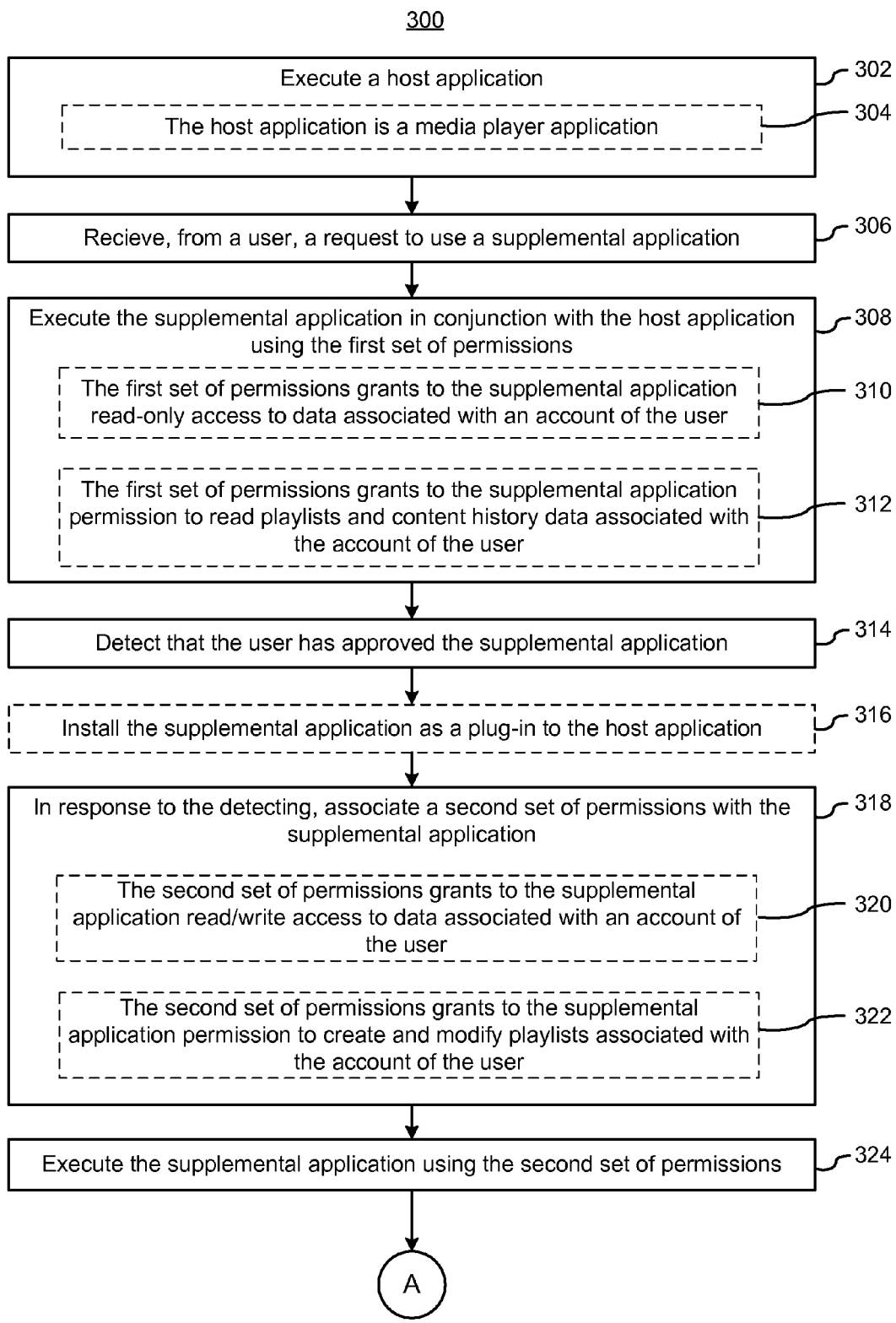
FIGS. 3A-3B are flow diagrams illustrating a method for handling application permissions in accordance with some implementations.

FIG. 3A is a flow diagram representing a method 300 for handling application permissions, according to some implementations. The method 300 is performed at least in part at a client computer (e.g., the client computer 102) having at least one processor and memory, the memory storing instructions for execution by the processor.

A host application is executed (302) (e.g., the host application 112). In some implementations, the host application is a media player/browser application (304). In some implementations, the host application is executed within an operating system. Examples and properties of host applications are described above.

A request to use a supplemental application is received from a user (306). In some implementations, the request corresponds to a user selection of a supplemental application. For example, the host application may have a supplemental application browsing area, where users can browse and/or search for supplemental applications to use in conjunction with the host application. Thus, the user may select the supplemental application, for example, by selecting an affordance. In some implementations, the affordance is a button or other selectable element that is labeled "preview," "use," "download," "try," "install," "add," or the like. In some implementations, the affordance is an icon that launches the supplemental application without adding it to a user-specific list of applications.

The supplemental application is executed in conjunction with the host application using the first set of permissions (308). Some aspects of executing a supplemental application in conjunction with a host application are discussed above. In some implementations, executing the supplemental application in conjunction with the host application using the second set of permissions includes determining whether requests and/or commands issued from the supplemental application (e.g., as application programming interface calls to the host application) are permitted by the first set of permissions. In some implementations, the host application determines whether the requests and/or commands are permitted by the first set of permissions. In some implementations, a content server determines whether the requests and/or commands are permitted by the first set of permissions. This may be implemented in cases where the supplemental application issues requests and/or commands directly to the content server (i.e., without the host application intercepting and/or restricting the requests and/or commands).

In some implementations, the first set of permissions grants to the supplemental application read-only access to data associated with an account of the user (310). In some implementations, read-only access allows a supplemental application to read but not modify playlists, profile information, content history data (e.g., play history), social networking activity (e.g., posts to, by, or about the user), data about shared media items, etc. that are associated with the account of the user (312). In some implementations, the permissions in the first set of permissions are the same for all supplemental applications.

It is detected that the user has approved the supplemental application (314). In some implementations, the user approves the supplemental application by selecting an affordance, such as a button or other selectable element that is labeled "preview," "use," "download," "try," "install," "add," "approve," "bookmark" or the like. In some implementations, detecting that the user has approved the supplemental application includes receiving (e.g., at the client computer 102) the selection of the affordance. In some implementations, detecting that the user has approved the supplemental application includes receiving an indication from a content server (e.g., the content server 104) that the user has previously approved the supplemental application.

In response to the detecting, a second set of permissions are associated with the supplemental application (318). In some implementations, the second set of permissions grants to the supplemental application read/write access to data associated with an account of the user (320). In some implementations, the second set of permissions grants to the supplemental application permission to create and modify playlists associated with the account of the user (322). The second set of permissions may also allow the supplemental application to post to social networks on the user's behalf, share playlists with other users, etc.

The supplemental application is executed using the second set of permissions (324). Some aspects of executing a supplemental application in conjunction with a host application are discussed above. Analogous to executing the supplemental application with the first set of permissions, in some implementations, executing the supplemental application in conjunction with the host application using the second set of permissions includes determining whether requests and/or commands issued from the supplemental application (e.g., as application programming interface calls to the host application) are permitted by the second set of permissions. In some implementations, the host application determines whether the requests and/or commands are permitted by the second set of permissions. In some implementations, a content server determines whether the requests and/or commands are permitted by the second set of permissions. This may be implemented, for example, in cases where the supplemental application issues requests and/or commands directly to the content server (i.e., without the host application intercepting and/or restricting the requests and/or commands).

Figure 3B:
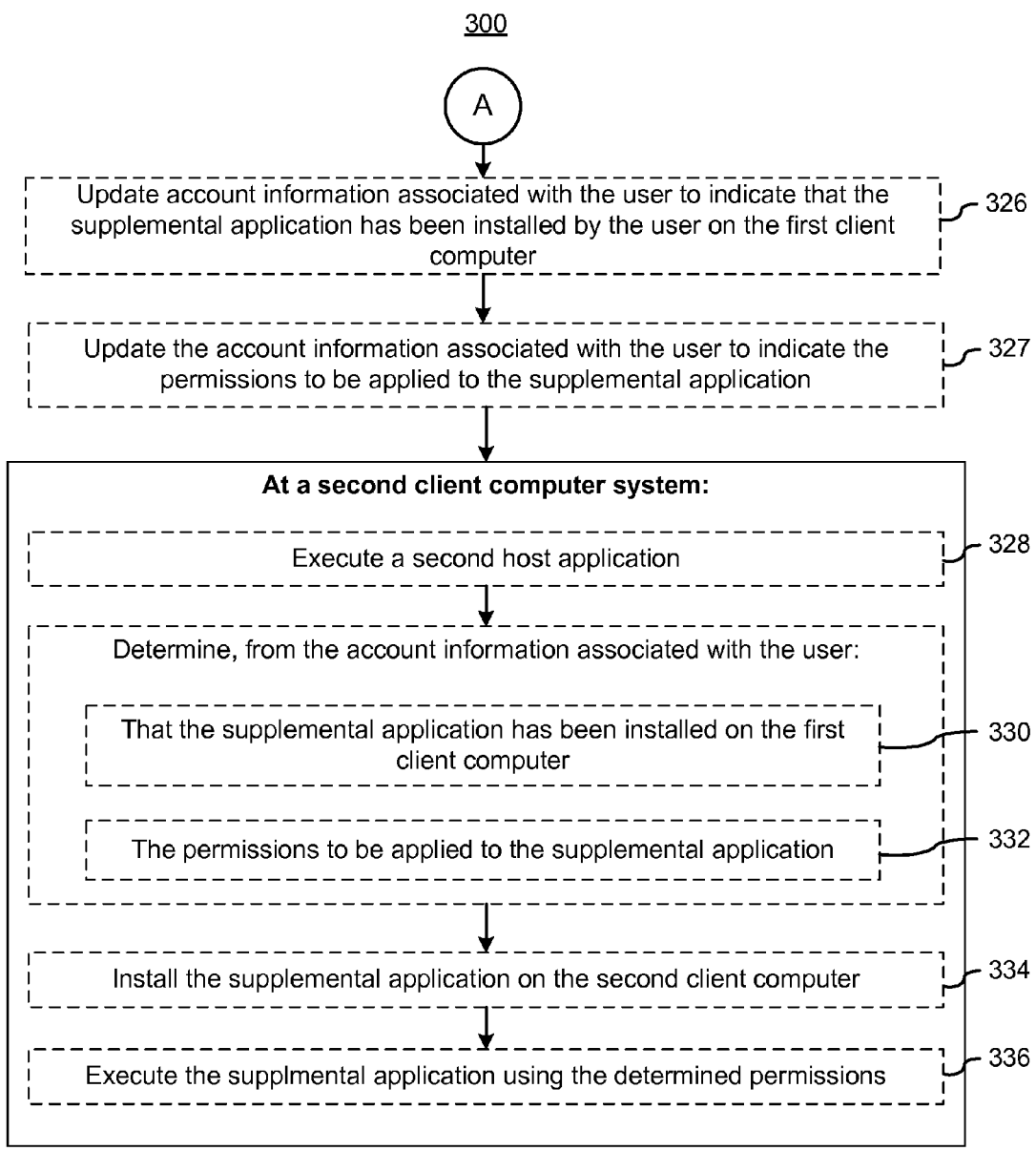

Method 300 continues on FIG. 3B, which relates to implementations of the method 300 where a user's supplemental applications and the permissions associated therewith are synchronized across devices and/or instances of the host application. For example, a content provider (e.g., content provider 105) may store account information (e.g., at the content server 104) so that a user can access content from host applications on various different devices. By storing the account information, information such as user preferences, histories, profile information, and the like can be available to different instances of a host application 112 no matter what device it is running on. Thus, a user can access the content server 104 from his home computer at one time, and then from his smart phone at another time—in each case, the stored information can be used to synchronize the user experience for both instances of use. Thus, a user's playlists, play history, friend lists, social network account information, saved/favorited media content, etc. will be accessible by both devices. In some implementations, the user's account information also includes identifiers of supplemental applications that have been installed by the user and/or selected by the user for trial or preview. Supplemental applications that a user has selected and/or installed in one instance of a host application may then be installed and/or made available to the user in another instance of the host application (e.g., on a different device). Further, in implementations where the host application is web-based, the host application can access the account information of the user—including those supplemental applications that have been selected and/or installed by the user on a different instance of the host application—and make those supplemental applications available to the user. For example, when the user logs-in to a web-based host application, the supplemental applications that the user has selected and/or installed are displayed in a list of applications from which the user can choose.

Returning to FIG. 3B, in some implementations, account information associated with the user is updated to indicate that the supplemental application has been installed by the user on the first client computer (326). Thus, as described above, client computers and/or host applications may access a user's account information to determine what supplemental applications the user has installed on other client computer and/or host applications. In some implementations, account information associated with the user is updated to indicate the permissions to be applied to the supplemental application (327). Thus, when computers and/or host applications access the account information in order to determine what supplemental applications are to be installed (and what permissions are to be associated with them), they will mimic the configuration of the other client computers and/or host applications associated with the user.

In some implementations, the account information, including identifiers of the installed supplemental applications, are stored at a server associated with a content provider (e.g., the content server 104 of the content provider 105). At a second client computer system, a second host application is executed (328). In some implementations, the second client computer system is any computer system (e.g., personal computer, tablet computer, smart phone, or any other device capable of executing the second host application) that is separate from the first client computer system. In some implementations, the second host application is a separate instance of the first host application (e.g., it is the same program but is running on a different computer or within a different user account of the same computer). In some implementations, the second host application provides the same or similar content access as the first host application, but is configured to be executed by a different device. For example, the first host application may be configured to be executed by a personal computer (e.g., running WINDOWS or MAC OS operating systems), whereas the second host application may be configured to be executed by a smart phone or tablet computer (e.g., running IOS or ANDROID mobile operating systems).

In some implementations, it is determined that the supplemental application has been installed on the first client computer (330). As noted above, this information may be included in the account information associated with a user and stored at the server. Thus, in some implementations, determining that the supplemental application has been installed on the first computer includes receiving, from the content server (e.g., content server 104), an indication that the user has installed the supplemental application on the first client computer. In some implementations, the permissions to be applied to the supplemental application is determined (332). In some implementations, the supplemental application is installed on the second client computer (334). Thus, for example, when the second host application is initiated, the second client computer and/or the content server determines (e.g., by consulting the user's account information on the content server 104) what supplemental applications have been installed on the first client computer, and what permissions are to be applied to those supplemental applications. Thus, all (or a subset) of the user's supplemental applications are installed on the second electronic device, and those supplemental applications that are in a "preview" period are only executed with the first set of permissions, while those that have been approved are executed with the second set of permissions. In some implementations, the supplemental application is executed (e.g., on the second client computer system) using the determined permissions (336).

Figure 4:
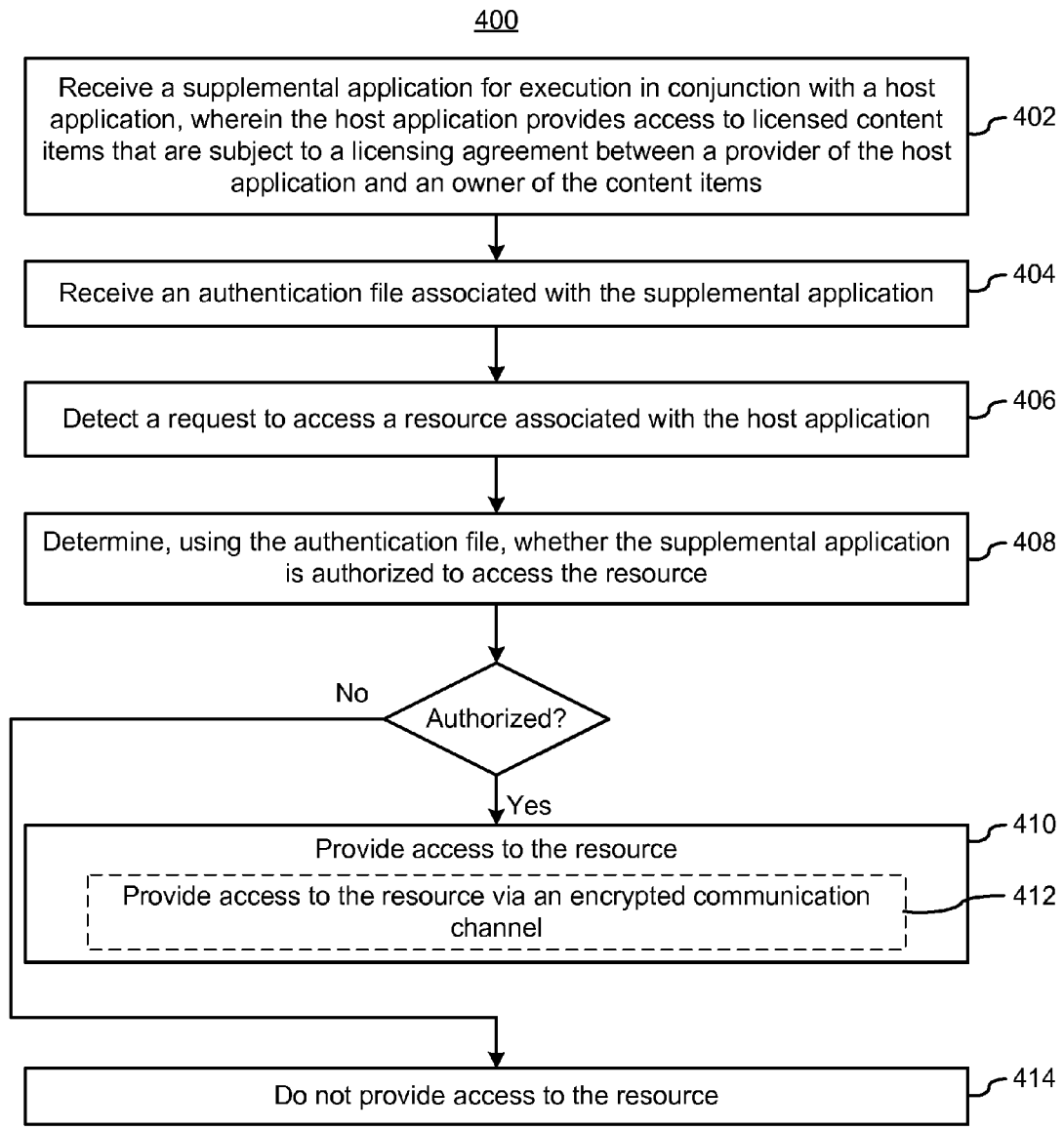
FIG. 4 is a flow diagram illustrating a method for authorizing access to resources in accordance with some implementations.

FIG. 4 is a flow diagram representing a method 400 for handling application permissions, according to some implementations. The method 400 is performed at least in part at a client computer (e.g., the client computer 102) having at least one processor and memory, the memory storing instructions for execution by the processor.

A supplemental application for execution in conjunction with a host application is received, wherein the host application (e.g., the host application 112) provides access to licensed content items that are subject to a licensing agreement between a provider of the host application (e.g., the content provider 105) and an owner of the content items (e.g., the content owner 107) (402). Content licensing agreements and their impacts on the technology and methods used to distribute the licensed content are described above.

An authentication file associated with the supplemental application is received (404). In some implementations, the authentication file is encrypted. In some implementations, the authorization file is cryptographically signed. In some implementations, the authorization file is created by encrypting a hash of the computer code of a supplemental application. Encryption techniques such as public-key cryptographically (i.e., asymmetric key cryptography) are used, but any appropriate encryption scheme can be used. The authentication file for a supplemental application may be created by a content provider 105 after it approves the supplemental application for use with the supplemental application 112. For example, a third-party may produce a supplemental application and submit it to the content provider for approval. Once it is approved, the content provider creates a hash of the code and encrypts it using a private key. This authentication file is then distributed with the supplemental application. Then, when a supplemental application is executed or installed, the host application (and/or the content server 104) can create a real-time hash of the code, decrypt the hash using a public key, and compare the decrypted value to the real-time hash, and determine if the values match. A match indicates that the supplemental application is, in fact, the same as that which was approved by the content provider.

Returning to method 400, a request to access a resource associated with the host application is detected (406). In some implementations, the request to access the resource originates from the supplemental application. In some implementations, the request to access the resource corresponds to and/or is part of an installation procedure for the supplemental application. In some implementations, the request to access the resource is a request to access at least one of the licensed content items. (In some implementations, the at least one of the licensed content items may be stored at a server remote from the client computer system; in some implementations it is stored at the client computer system.) In some implementations, the request to access the resource is a request to access an application programming interface of the host application.

It is determined, using the authentication file, whether the supplemental application is authorized to access the resource (408). As described above, in some implementations, this includes determining whether a hash value from the authentication file matches a real-time hash of the supplemental application. If the supplemental application is authorized to access the resource, access to the resource is provided (410). For example, the requested content file is provided to the supplemental application and/or the host application (e.g., for presentation to the user, inclusion into a playlist, etc.), the host application responds to an application programming interface call issued by the supplemental application, or the like. In some implementations, providing access to the resource includes providing access to the resource via an encrypted communication channel (412). As described above, in some implementations, the host application controls an encrypted communication channel with a content server (e.g., server 104, other client computers acting as servers, etc.). Thus, in some implementations, when it is determined that the supplemental application is authorized to access a resource (e.g., a content item stored at the content server 104), the host application allows the supplemental application to issue communications to the content server directly.

If, however, the supplemental application is not authorized to access the resource, access is not provided to the resource (414). In some implementations, this results in a supplemental application not being installed in the host application 112. In some implementations, this results in requests from an installed supplemental application being denied, ignored, or otherwise not acted upon.

Figure 5:
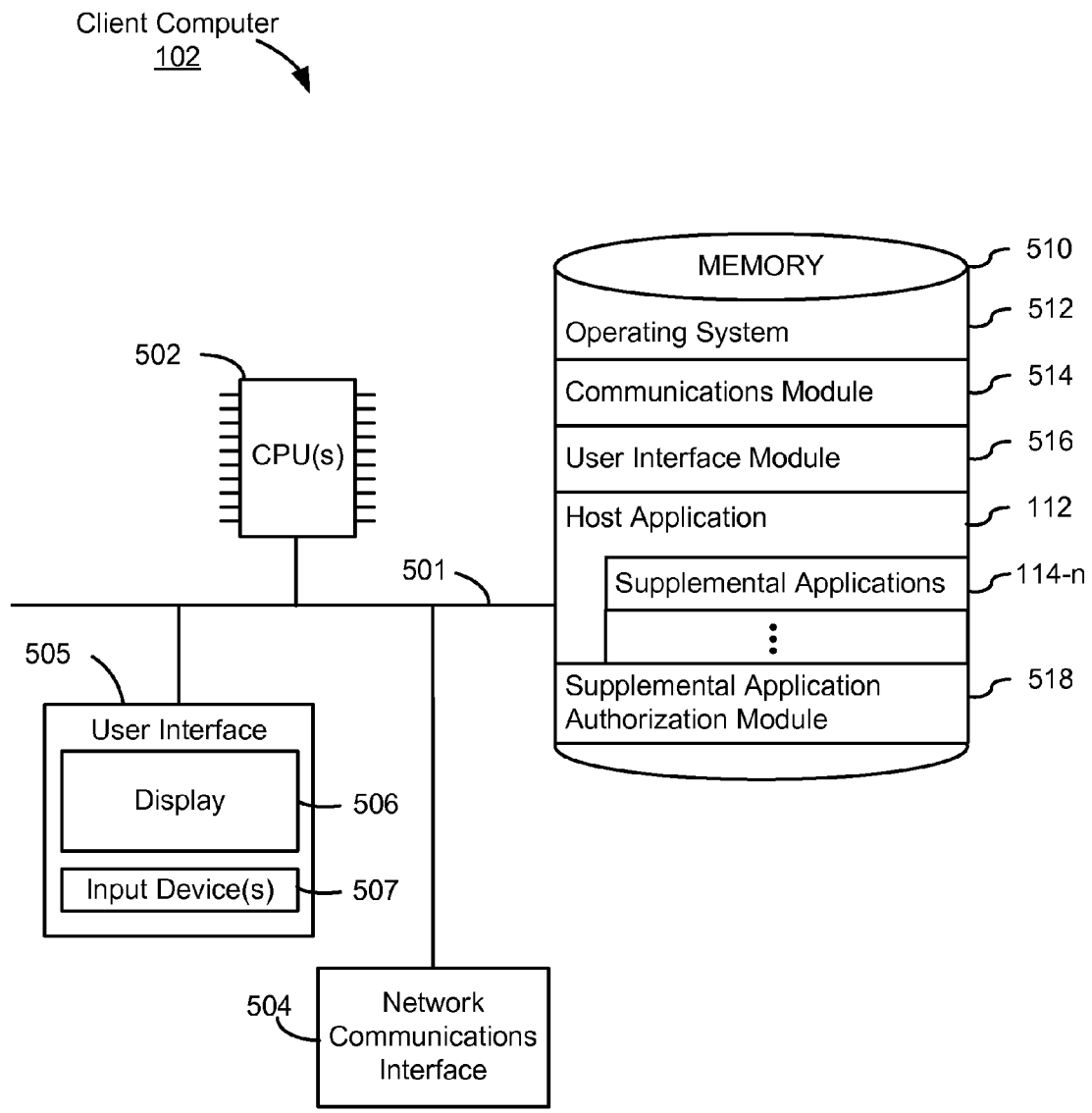
FIG. 5 is a block diagram illustrating a client computer system in accordance with some implementations.

FIG. 5 is a block diagram illustrating a client computer 102, according to some implementations. The client computer 102 typically includes one or more processing units (CPUs, sometimes called processors) 502 for executing programs (e.g., programs stored in memory 510), one or more network or other communications interfaces 504, user interface 505, memory 510, and one or more communication buses 501 for interconnecting these components. The communication buses 501 may include circuitry (sometimes called a chipset) that interconnects and controls communications between system components. In some implementations, the user interface 505 comprises a display 506 and input device(s) 507 (e.g., keyboard, mouse, touchscreen, keypads, etc.).

Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory devices(s) within memory 510, comprises a non-transitory computer readable storage medium. In some implementations, memory 510 or the computer readable storage medium of memory 510 stores the following programs, modules, and data structures, or a subset thereof:

- an operating system 512 that includes procedures for handling various basic system services and for performing hardware dependent tasks;
- a communications module 514 that is used for connecting the client computer 102 to other computers (e.g., the content server 104, and/or the supplemental application servers 106-$n$) via the one or more communication interfaces 504 (wired or wireless) and one or more communication networks 108, such as the Internet, other wide area networks, local area networks, metropolitan area networks, and so on;
- a user interface module 516 that receives commands from the user via the input device(s) 507 and generates user interface objects in the display device 506;
- a host application 112 that allows a user to access resources (e.g., content items (e.g., media content), supplemental applications 114-$n$, etc.) stored on the content server 104, the supplemental application servers 106-$n$, other client computers, etc., and that serves as a platform for supplemental applications 114-$n$;
- one or more supplemental applications 114-$n$ that are configured to be installed in and/or executed in conjunction with the host application 114; and
- a supplemental application authorization module 518 that determines whether a supplemental application 114-$n$ is authorized to access a resource of the content server 104 and/or the host application 112.

In some implementations, the programs or modules identified above correspond to sets of instructions for performing a function or method described above, including those described with reference to FIGS. 1-4. The sets of instructions can be executed by one or more processors (e.g., the CPUs 502). The above identified modules or programs (i.e., sets of instructions) need not be implemented as separate software programs, procedures, or modules, and thus various subsets of these programs or modules may be combined or otherwise re-arranged in various implementations. In some implementations, memory 510 stores a subset of the modules and data structures identified above. Furthermore, memory 510 may store additional modules and data structures not described above.

Figure 6:
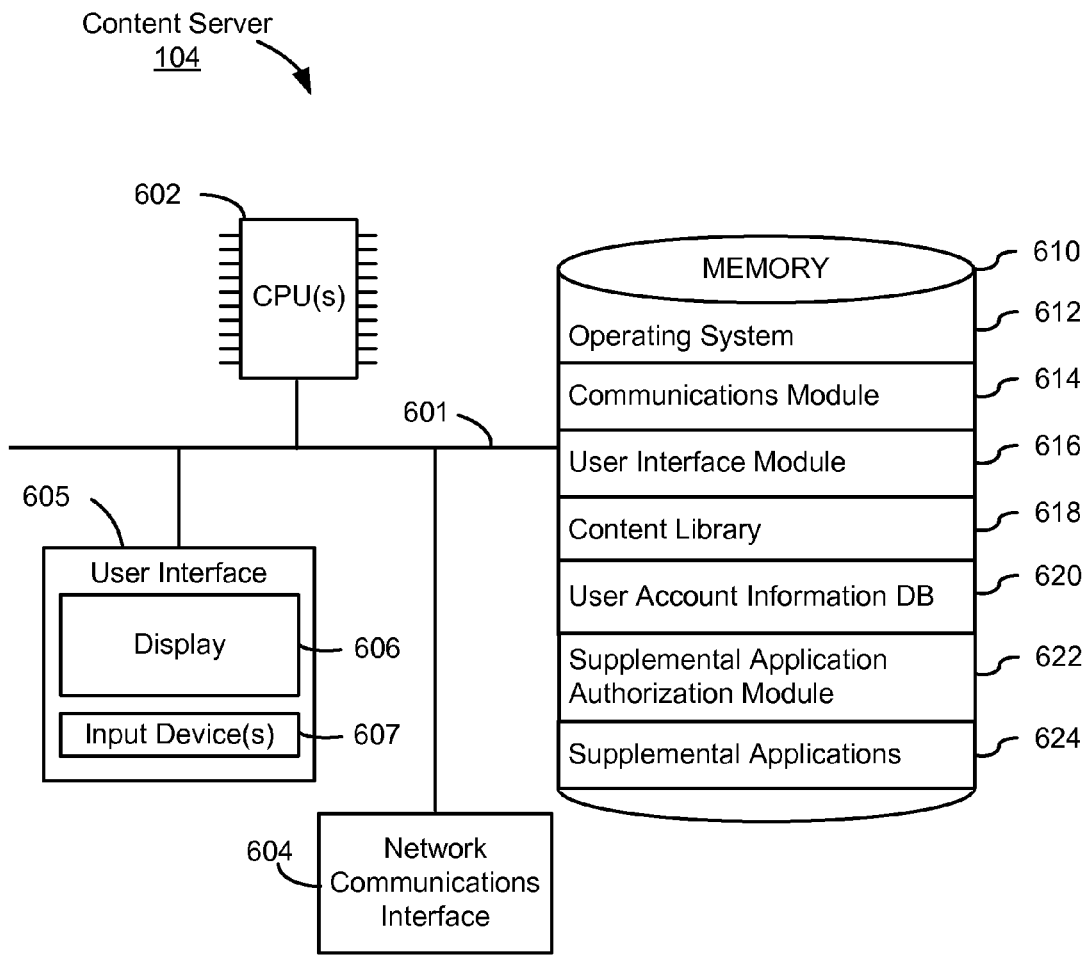
FIGS. 6-7 are a block diagrams illustrating server computer systems in accordance with some implementations.

FIG. 6 is a block diagram illustrating a content server 104, according to some implementations. The content server 104 typically includes one or more processing units (CPUs, sometimes called processors) 602 for executing programs (e.g., programs stored in memory 610), one or more network or other communications interfaces 604, an optional user interface 605, memory 610, and one or more communication buses 601 for interconnecting these components. The communication buses 601 may include circuitry (sometimes called a chipset) that interconnects and controls communications between system components. In some implementations, the user interface 605 comprises a display 606 and input device(s) 607 (e.g., keyboard, mouse, touchscreen, keypads, etc.).

Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory devices(s) within memory 610, comprises a non-transitory computer readable storage medium. In some implementations, memory 610 or the computer readable storage medium of memory 610 stores the following programs, modules, and data structures, or a subset thereof:

- an operating system 612 that includes procedures for handling various basic system services and for performing hardware dependent tasks;
- a communications module 614 that is used for connecting the content server 104 to other computers (e.g., the client computer 102 and/or the supplemental application servers 106-$n$) via the one or more communication interfaces 604 (wired or wireless) and one or more communication networks 108, such as the Internet, other wide area networks, local area networks, metropolitan area networks, and so on;
- an optional user interface module 616 that receives commands from the user via the input device(s) 607 and generates user interface objects in the display device 606;
- a content library 618 that contains content items (e.g., media content items, such as podcasts, music, spoken word, radio shows, movies, television shows, user-generated videos, animations, images, or various combinations of these content types);
- a user account information database 620 that stores account information for users of the content server 104, including (for each user) account credentials (including an account for the content provider 104 and/or other accounts such as for social networks and/or other services), user profiles, user preferences, identifiers of installed supplemental applications 114-$n$, permissions that are associated with the supplemental applications 114-$n$, playlists, play histories, lists of liked/favorited/disliked content items, and/or other user information;
- a supplemental application authorization module 622 that determines whether a supplemental application 114-$n$ is authorized to access a resource of the content server 104 and/or the host application 112; and
- supplemental applications 624 that are accessible (e.g., for download, remote execution, and or installation) to the host application 112 of the client computer 102.

In some implementations, the programs or modules identified above correspond to sets instructions for performing a function or method described above, including those described with reference to FIGS. 1-4. The sets of instructions can be executed by one or more processors (e.g., the CPUs 602). The above identified modules or programs (i.e., sets of instructions) need not be implemented as separate software programs, procedures, or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Figure 7:
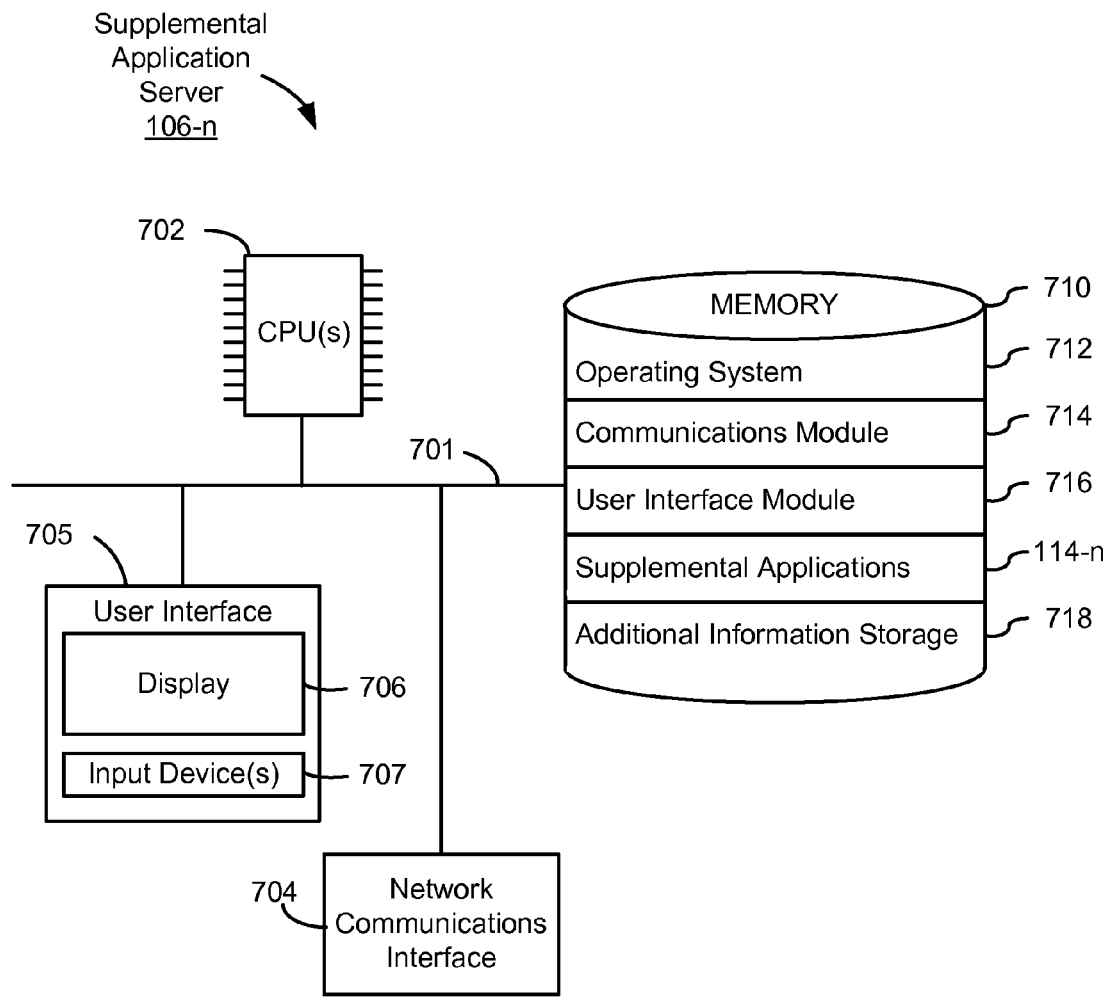

FIG. 7 is a block diagram illustrating a supplemental application server 106-*n*, according to some implementations. The supplemental application server 106-*n* typically includes one or more processing units (CPUs, sometimes called processors) 702 for executing programs (e.g., programs stored in memory 710), one or more network or other communications interfaces 704, an optional user interface 705, memory 710, and one or more communication buses 701 for interconnecting these components. The communication buses 701 may include circuitry (sometimes called a chipset) that interconnects and controls communications between system components. In some implementations, the user interface 705 comprises a display 706 and input device(s) 707 (e.g., keyboard, mouse, touchscreen, keypads, etc.).

Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory devices(s) within memory 710, comprises a non-transitory computer readable storage medium. In some implementations, memory 710 or the computer readable storage medium of memory 710 stores the following programs, modules, and data structures, or a subset thereof:
- an operating system 712 that includes procedures for handling various basic system services and for performing hardware dependent tasks;
- a communications module 714 that is used for connecting the supplemental application server 106-*n* to other computers (e.g., the client computer 102, the web server 104, the token server 502, and/or the DNS server 114) via the one or more communication interfaces 704 (wired or wireless) and one or more communication networks 108, such as the Internet, other wide area networks, local area networks, metropolitan area networks, and so on;
- an optional user interface module 716 that receives commands from the user via the input device(s) 707 and generates user interface objects in the display device 706;
- supplemental applications 114-*n* that are accessible (e.g., for download, remote execution, and or installation) to the host application 112 of the client computer 102, and/or to the content server 104; and
- additional information storage 718 that the supplemental application(s) 114-*n* associated with that server may access, download, modify, or otherwise use when they are executed.

In some implementations, the additional information 718 includes any information that a supplemental application 114-*n* associated with the supplemental application server 106-*n* uses or relies on. For example, a supplemental application may cause song lyrics of a song being played back on the host application 112 to be displayed. Those song lyrics may be stored in the additional information storage 718 in the supplemental application server 106-*n*. Other information that may be stored in additional information storage 718 includes, but is not limited to, account information of the user (e.g., login credentials, user profile information, etc.) reviews (e.g., editorial reviews of music, movie, television, or other content), user playback histories, playlists, social activity, and the like.

In some implementations, the programs or modules identified above correspond to sets instructions for performing a function or method described above, including those described with reference to FIGS. 1-4. The sets of instructions can be executed by one or more processors (e.g., the CPUs 702). The above identified modules or programs (i.e., sets of instructions) need not be implemented as separate software programs, procedures, or modules, and thus various subsets of these programs or modules may be combined or otherwise re-arranged in various implementations. In some implementations, memory 710 stores a subset of the modules and data structures identified above. Furthermore, memory 710 may store additional modules and data structures not described above.

Although FIGS. 5-7 show client and server computers, these Figures are intended more as functional descriptions of the various features which may be present in these computers than as structural schematics of the implementations described herein. In practice, and as recognized by those of ordinary skill in the art, items shown separately could be combined and some items could be separated. For example, some items shown separately in FIGS. 5-10 could be implemented in single modules or data structures.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementations. In general, structures and functionality presented as separate components in the example configurations may be implemented as a combined structure or component. Similarly, structures and functionality presented as a single component may be implemented as separate components. These and other variations, modifications, additions, and improvements fall within the scope of the described implementations.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

It will also be understood that, although the terms "first," "second," etc. may be used herein to describe various elements, these elements should not be limited by these terms. These terms are only used to distinguish one element from another. For example, a first server could be termed a second server, and, similarly, a second server could be termed a first server, without changing the meaning of the description, so long as all occurrences of the "first server" are renamed consistently and all occurrences of the "second server" are renamed consistently.

Further, the terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Finally, as used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

We claim:

1. A computer-implemented method for providing access to content, comprising:
   at a client computer system having a processor and memory:
      executing a host application associated with a first party, wherein the first party has secured the right to play licensed content;
      initiating a secure communication channel between the host application and a server associated with the first party, wherein the secure communication channel is not accessible to applications executed separately from the host application;
      executing a supplemental application associated with a second party; and
      obtaining, from the supplemental application, an indication of a user selection of respective content for playback at the client computer system, wherein the respective content is licensed content and the supplemental application is not independently authorized to play the respective content;
   in response to obtaining the indication from the supplemental application:
      accessing the respective content via the secure communication channel; and
      initiating playback of the respective content in response to the user selection of the respective content in the supplemental application, wherein the playback is performed by the host application.

2. The method of claim 1, wherein the first party and the second party are different business entities, the host application is developed by the first party, and the supplemental application is developed by the second party and approved by the first party.

3. The method of claim 1, wherein the supplemental application extends the functionality of the host application.

4. The method of claim 1, wherein the supplemental application is a plug-in to the host application.

5. The method of claim 1, wherein the host application is a media player application.

6. The method of claim 1, wherein the licensed content includes a plurality of audio files.

7. The method of claim 6, wherein the indication of the user selection of the respective content comprises a selection of an affordance provided by the supplemental application.

8. The method of claim 7, further comprising streaming the audio file from the server to the client computer system.

9. The method of claim 8, wherein the server is a second client computer system.

10. The method of claim 1, wherein the licensed content includes a plurality of video files.

11. The method of claim 10, wherein the indication of the user selection of the respective content comprises a selection of an affordance provided by the supplemental application.

12. The method of claim 11, further comprising streaming the video file from the server to the client computer system.

13. The method of claim 12, wherein the server is a second client computer system.

14. The method of claim 1, wherein the supplemental application is authorized by the first party for use with the host application.

15. The method of claim 1, wherein the supplemental application accesses services of one or both of the host application and the first party via one or more application programming interfaces of the host application.

16. The method of claim 15, wherein the services are selected from the group consisting of:
   initiate presentation of a content item;
   terminate presentation of a content item;
   add a content item to an existing playlist;
   associate a new playlist with the host application;
   purchase a content item;
   access a list of top charts of content items;
   access editorial reviews of content items;
   access personalized recommendations of content items;
   access content items related to a selected content item;
   notify an upcoming concert or event;
   access promotional material about a concert or event;
   purchase tickets to a concert or event;
   initiate presentation of a game;
   register a high score in a game;
   view a leader board of high scores in a game;
   access song lyrics;
   add, edit, or correct song lyrics;
   access information about users in a social graph;
   access a list of followers in a social network;
   access an influence score in a social network;
   access a status notification in a social network;
   post a status notification in a social network; and
   push a content item to users in a social network.

17. The method of claim 1, wherein the licensed content is not available to applications that are executed separately from the host application.

18. The method of claim 1, wherein the host application is executed within an operating system.

19. The method of claim 1, wherein the supplemental application can only be executed in conjunction with the host application.

20. The method of claim 1, wherein the licensed content is not permitted to be played back by applications that are executing on the client computer system separately from the host application.

21. The method of claim 1, wherein the secure communication channel uses Hypertext Transfer Protocol Secure (HTTPS).

22. The method of claim 1, wherein the secure communication channel uses encrypted communications.

23. The method of claim 1, wherein initiating the secure communication channel includes authenticating the server.

24. The method of claim 1, wherein the content is stored on the server.

25. The method of claim 1, wherein the content was previously downloaded from the server to the client computer system.

26. An electronic device, comprising:
one or more processors;
memory; and
one or more programs, wherein the one or more programs are stored in the memory and configured to be executed by the one or more processors, the one or more programs including instructions for performing steps comprising:
executing a host application associated with a first party, wherein the first party has secured the right to play licensed content;
initiating a secure communication channel between the host application and a server associated with the first party, wherein the secure communication channel is not accessible to applications executed separately from the host application;
executing a supplemental application associated with a second party; and
obtaining, from the supplemental application, an indication of a user selection of respective content for playback at the client computer system, wherein the respective content is licensed content and the supplemental application is not independently authorized to play the respective content;
in response to obtaining the indication from the supplemental application:
accessing the respective content via the secure communication channel; and
initiating playback of the respective content in response to the user selection of the respective content in the supplemental application, wherein the playback is performed by the host application.

27. The electronic device of claim 26, wherein the first party and the second party are different business entities, the host application is developed by the first party, and the supplemental application is developed by the second party and approved by the first party.

28. The electronic device of claim 26, wherein the supplemental application extends the functionality of the host application.

29. The electronic device of claim 26, wherein the supplemental application is a plug-in to the host application.

30. The electronic device of claim 26, wherein the host application is a media player application.

31. The electronic device of claim 26, wherein the licensed content includes a plurality of audio files.

32. The electronic device of claim 31, wherein the indication of the user selection of the respective content comprises a selection of an affordance provided by the supplemental application.

33. The electronic device of claim 32, the one or more programs further including instructions for performing steps comprising streaming the audio file from the server to the client computer system.

34. The electronic device of claim 26, wherein the server is a second client computer system.

35. The electronic device of claim 26, wherein the licensed content includes a plurality of video files.

36. The electronic device of claim 35, wherein the indication of the user selection of the respective content comprises a selection of an affordance provided by the supplemental application.

37. The electronic device of claim 36, the one or more programs further including instructions for performing steps comprising streaming the video file from the server to the client computer system.

38. The electronic device of claim 37, wherein the server is a second client computer system.

39. The electronic device of claim 26, wherein the supplemental application is authorized by the first party for use with the host application.

40. The electronic device of claim 26, wherein the supplemental application accesses services of one or both of the host application and the first party via one or more application programming interfaces of the host application.

41. The electronic device of claim 40, wherein the services are selected from the group consisting of:
initiate presentation of a content item;
terminate presentation of a content item;
add a content item to an existing playlist;
associate a new playlist with the host application;
purchase a content item;
access a list of top charts of content items;
access editorial reviews of content items;
access personalized recommendations of content items;
access content items related to a selected content item;
notify an upcoming concert or event;
access promotional material about a concert or event;
purchase tickets to a concert or event;
initiate presentation of a game;
register a high score in a game;
view a leader board of high scores in a game;
access song lyrics;
add, edit, or correct song lyrics;
access information about users in a social graph;
access a list of followers in a social network;
access an influence score in a social network;
access a status notification in a social network;
post a status notification in a social network; and
push a content item to users in a social network.

42. The electronic device of claim 26, wherein the licensed content is not available to applications that are executed separately from the host application.

43. The electronic device of claim 26, wherein the host application is executed within an operating system.

44. The electronic device of claim 26, wherein the supplemental application can only be executed in conjunction with the host application.

45. The electronic device of claim 26, wherein the licensed content is not permitted to be played back by applications that are executing on the client computer system separately from the host application.

46. The electronic device of claim 26, wherein the secure communication channel uses Hypertext Transfer Protocol Secure (HTTPS).

47. The electronic device of claim 26, wherein the secure communication channel uses encrypted communications.

48. The electronic device of claim 26, wherein initiating the secure communication channel includes authenticating the server.

49. The electronic device of claim 26, wherein the content is stored on the server.

50. The electronic device of claim 26, wherein the content was previously downloaded from the server to the client computer system.

51. A non-transitory computer readable storage medium storing one or more programs, the one or more programs comprising instructions, which when executed by an electronic device, cause the device to perform steps comprising:

executing a host application associated with a first party, wherein the first party has secured the right to play licensed content;

initiating a secure communication channel between the host application and a server associated with the first party, wherein the secure communication channel is not accessible to applications executed separately from the host application;

executing a supplemental application associated with a second party; and obtaining, from the supplemental application, an indication of a user selection of respective content for playback at the client computer system, wherein the respective content is licensed content and the supplemental application is not independently authorized to play the respective content;

in response to obtaining the indication from the supplemental application:
  accessing the respective content via the secure communication channel; and
  initiating playback of the respective content in response to the user selection of the respective content in the supplemental application, wherein the playback is performed by the host application.

52. The computer readable storage medium of claim 51, wherein the first party and the second party are different business entities, the host application is developed by the first party, and the supplemental application is developed by the second party and approved by the first party.

53. The computer readable storage medium of claim 51, wherein the supplemental application extends the functionality of the host application.

54. The computer readable storage medium of claim 51, wherein the supplemental application is a plug-in to the host application.

55. The computer readable storage medium of claim 51, wherein the host application is a media player application.

56. The computer readable storage medium of claim 51, wherein the licensed content includes a plurality of audio files.

57. The computer readable storage medium of claim 56, wherein the indication of the user selection of the respective content comprises a selection of an affordance provided by the supplemental application.

58. The computer readable storage medium of claim 57, the one or more programs further comprising instructions, which when executed by the electronic device, cause the device to perform steps comprising streaming the audio file from the server to the client computer system.

59. The computer readable storage medium of claim 58, wherein the server is a second client computer system.

60. The computer readable storage medium of claim 51, wherein the licensed content includes a plurality of video files.

61. The computer readable storage medium of claim 60, wherein the indication of the user selection of the respective content comprises a selection of an affordance provided by the supplemental application.

62. The computer readable storage medium of claim 61, the one or more programs further comprising instructions, which when executed by the electronic device, cause the device to perform steps comprising streaming the video file from the server to the client computer system.

63. The computer readable storage medium of claim 62, wherein the server is a second client computer system.

64. The computer readable storage medium of claim 51, wherein the supplemental application is authorized by the first party for use with the host application.

65. The computer readable storage medium of claim 51, wherein the supplemental application accesses services of one or both of the host application and the first party via one or more application programming interfaces of the host application.

66. The computer readable storage medium of claim 65, wherein the services are selected from the group consisting of:
initiate presentation of a content item;
terminate presentation of a content item;
add a content item to an existing playlist;
associate a new playlist with the host application;
purchase a content item;
access a list of top charts of content items;
access editorial reviews of content items;
access personalized recommendations of content items;
access content items related to a selected content item;
notify an upcoming concert or event;
access promotional material about a concert or event;
purchase tickets to a concert or event;
initiate presentation of a game;
register a high score in a game;
view a leader board of high scores in a game;
access song lyrics;
add, edit, or correct song lyrics;
access information about users in a social graph;
access a list of followers in a social network;
access an influence score in a social network;
access a status notification in a social network;
post a status notification in a social network; and
push a content item to users in a social network.

67. The computer readable storage medium of claim 51, wherein the licensed content is not available to applications that are executed separately from the host application.

68. The computer readable storage medium of claim 51, wherein the host application is executed within an operating system.

69. The computer readable storage medium of claim 51, wherein the supplemental application can only be executed in conjunction with the host application.

70. The computer readable storage medium of claim 51, wherein the licensed content is not permitted to be played back by applications that are executing on the client computer system separately from the host application.

71. The computer readable storage medium of claim 51, wherein the secure communication channel uses Hypertext Transfer Protocol Secure (HTTPS).

72. The computer readable storage medium of claim 51, wherein the secure communication channel uses encrypted communications.

73. The computer readable storage medium of claim 51, wherein initiating the secure communication channel includes authenticating the server.

74. The computer readable storage medium of claim 51, wherein the content is stored on the server.

75. The computer readable storage medium of claim 51, wherein the content was previously downloaded from the server to the client computer system.

* * * * *